United States Patent [19]

Choe

[11] Patent Number: 4,542,717
[45] Date of Patent: Sep. 24, 1985

[54] FUEL VAPORIZATION SYSTEM FOR AN INTERNAL COMBUSTION ENGINE

[76] Inventor: Jei S. Choe, 677 Gaines St., Port Charlotte, Fla. 33950

[21] Appl. No.: 535,705

[22] Filed: Sep. 26, 1983

[51] Int. Cl.⁴ ............................................. F02M 25/02
[52] U.S. Cl. .................. 123/25 B; 123/543; 123/552
[58] Field of Search ............. 123/25 B, 25 D, 25 P, 123/543, 552

[56] References Cited

U.S. PATENT DOCUMENTS

| | | | |
|---|---|---|---|
| 2,686,502 | 8/1954 | Tesch | 123/25 B |
| 3,968,775 | 7/1976 | Harpman | 123/25 B |
| 4,030,453 | 6/1977 | Sugimoto | 123/25 B |
| 4,050,419 | 9/1977 | Harpman et al. | 123/25 B |
| 4,145,998 | 3/1979 | Mahoney et al. | 123/25 B |
| 4,197,819 | 4/1980 | Mahoney et al. | 123/25 B |
| 4,333,422 | 6/1982 | Mahoney | 123/25 B |
| 4,368,711 | 1/1983 | Allen | 123/25 B |

*Primary Examiner*—Ira S. Lazarus
*Attorney, Agent, or Firm*—John C. Malloy

[57] ABSTRACT

The present invention is directed towards a fuel vaporization system designed primarily for use in automobile or like vehicle internal combustion engines. Liquid fuel such as gasoline is independently forced into a vaporization structure concurrently with the injection of water. The vaporization structure is disposed in direct heat receiving relation to the exhaust manifold of the engine such that heat received therefrom serves to vaporize the water and gasoline mixture prior to its exiting. The vaporized mixture is then fed into the intake manifold and more specifically into each of the plurality of cylinders of the engine. A control assembly includes a pressure switch structured to determine pressure within the vaporization structure to the extent that a decrease of the internal pressure below a predetermined level causes activation of the delivery systems and a continuing supply of water and gasoline mixture to the vaporization assembly until the predetermined pressure is reached and maintained.

8 Claims, 8 Drawing Figures

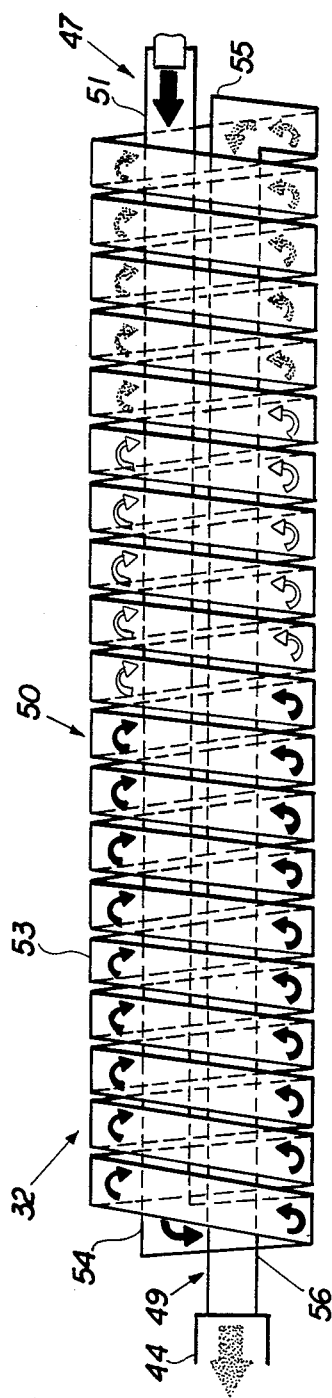
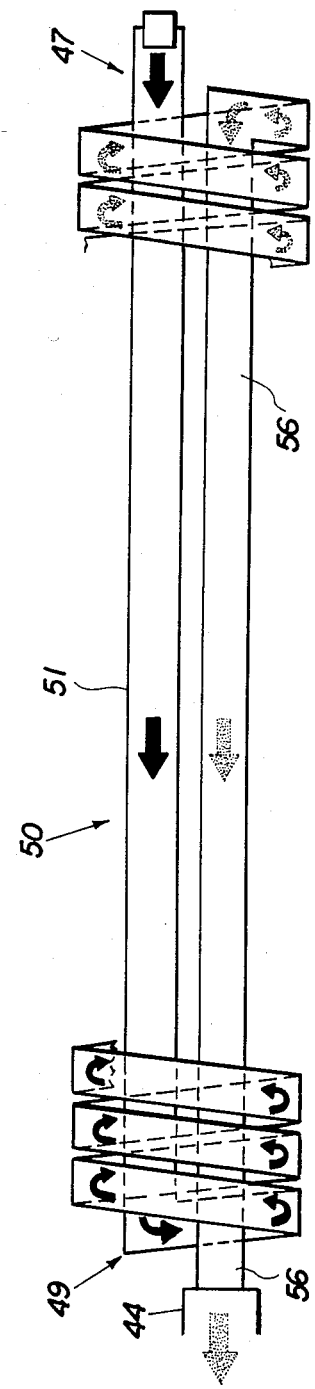
FIG. 7A
FIG. 7B

4,542,717

FUEL VAPORIZATION SYSTEM FOR AN INTERNAL COMBUSTION ENGINE

BACKGROUND OF THE INVENTION

1. Field of the Invention

The present invention is directed towards a system for vaporizing a liquid mixture of water and gasoline by heat derived from the exhaust manifold and feeding the vaporized mixture along with controlled air quantities from the carburetor to the individual cylinders of the engine.

2. Description of the Prior Art

There is a long standing goal in the automobile industry to design and structure an internal combustion engine and/or regulate fuel composition for the purpose of obtaining better gas mileage for conventional automobiles and like vehicles. A number of devices and/or methods have been designed, some of which have lead to a certain amount of success in reducing mileage to some extent. However, frequently these prior art attempts are impractical since they require major modification to existing internal combustion engines (hereinafter referred to as IC engines) or otherwise cause damage to existing IC engines when fuel composition is modified.

One concept which has been explored for many years is the injection of water along with gasoline or like liquid fuel into the combustion cylinders of an IC engine. This concept, in certain applications, increases work efficiency, rate of expansion and uses less gasoline. However, a vast number of the attempts to utilize water or water vapor are directed specifically to the injection of water into the combustion cylinders downstream of the carburetor. Heat from the combustion of the gasoline is relied upon to further vaporize the injected water.

As set forth above, while concepts of the type described above are operative in certain applications, none has resulted in technology which seriously increases the amount of mileage an automobile can travel on a gallon of gasoline or like fuel. Accordingly, there is a need in the automobile industry for additional technology directed to the modification of substantially conventional IC engines to the extent that mileage will be greatly increased without requiring significant structural modification of the engine itself or elaborate changes in the composition of the fuel mixture utilized.

SUMMARY OF THE INVENTION

The present invention comprises a fuel vaporization system primarily designed for use with an internal combustion engine of the type intended to power automobiles or like vehicles. Primarily, the system comprises the independent but concurrent delivery of liquid fuel such as gasoline and water to a vaporization means. The vaporization means is in the form of a vaporization tube mounted on the interior of or in heat receiving relation to the exhaust manifold of a typical IC engine. Conduit means are structured within the tube and defines a path of travel of the fuel-water mixture such that sufficient time elapses before the mixture exits the vaporization tube in the form of vapor. The time of travel of the fuel-water mixture is sufficient to allow requisite heat transfer to accomplish total vaporization of the mixture. The exiting vapor fuel is directed through a vapor control valve which is mechanically linked or otherwise designed to operate in cooperation with a conventional carburetor. The control valve, being synchronized with the carburetor, further directs the vapor fuel into the intake manifold and to the individual combustion cylinders of the engine. Additional features of the present invention include a control means including a switching assembly interconnected to a source of electrical power such as a battery and further interconnected in controlling relation to both the fuel delivery system and the water delivery system upstream of the exhaust manifold. The control means further regulates liquid fuel flow from a source, such as a conventional gasoline tank, to the carburetor and also from the fuel supply to the vaporization means as set forth above. Accordingly, when the fuel vaporization system is operated, flow of gasoline or liquid fuel to the carburetor is eliminated and, accordingly, the carburetor merely acts to control or regulate air flow to the individual cylinders. The subject fuel vaporization system serves to regulate the flow of the vaporized fuel mixture to the individual cylinders in synchronization or conjunction with air flow from the carburetor.

By virtue of the above, an internal combustion engine is allowed to efficiently power an automobile or like vehicle while at the same time including performance characteristics such as extremely high mileage with no loss of performance by the IC engine and substantially reduced toxic gas emission.

The invention accordingly comprises the features of construction, combination of elements and arrangements of parts which will be exemplified in the construction hereinafter set forth, and the scope of the invention will be indicated in the claims.

BRIEF DESCRIPTION OF THE DRAWINGS

For a fuller understanding of the nature of the present invention, reference is made to the following detailed description taken in connection with the accompanying drawings, in which:

FIGS. 7A and 7B are schematic representations of the water and fuel mixture within the vaporization means of the present invention.

Similar reference numerals refer to similar parts throughout the several views of the drawings.

DETAILED DESCRIPTION OF THE PREFERRED EMBODIMENT

Figure 1:
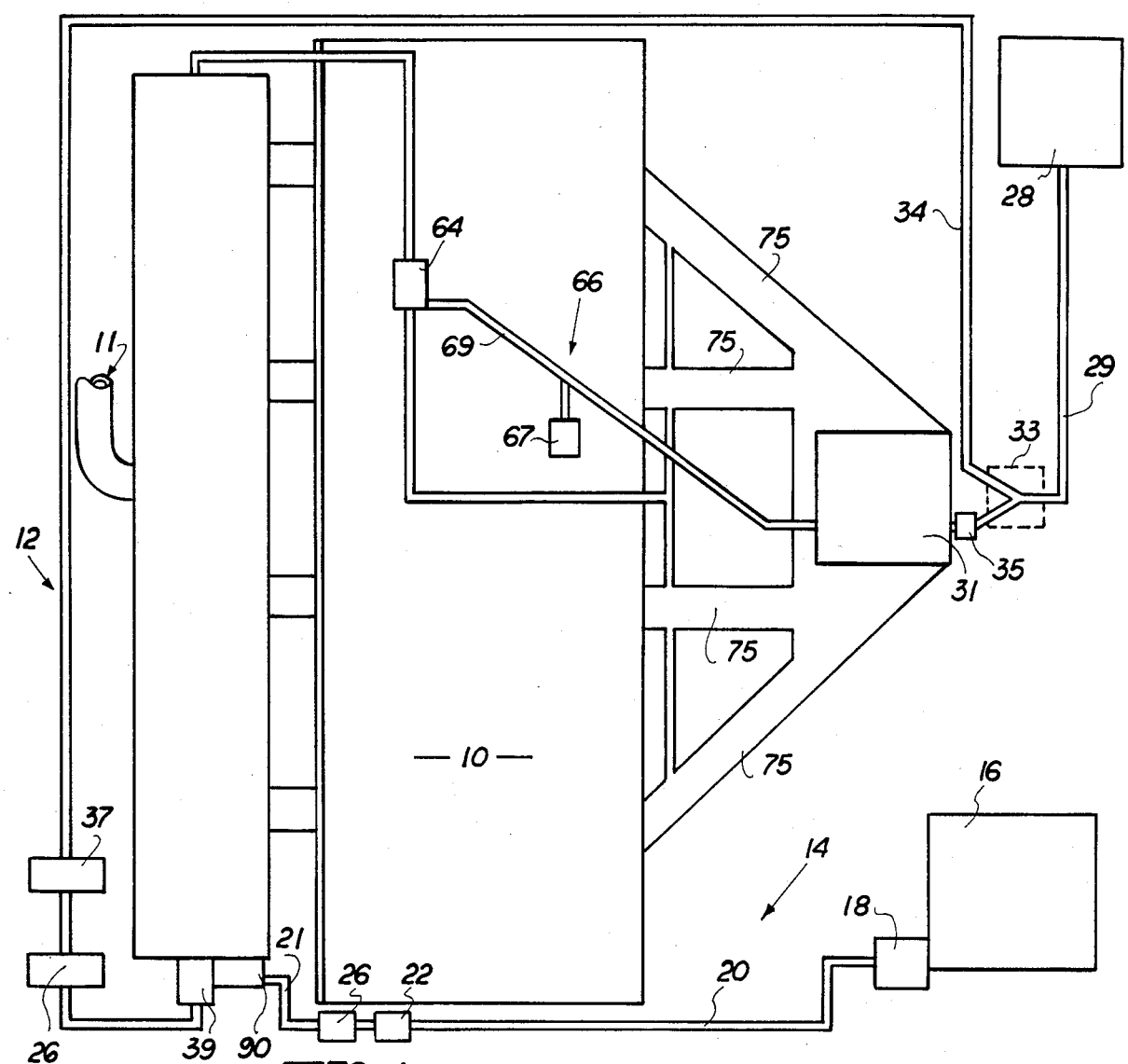
FIG. 1 is a schematic representation of the subject fuel vaporization system as it relates to an internal combustion engine.

As best shown in FIG. 1, the present invention is directed towards a fuel vaporization system of the type designed to be incorporated in a conventional internal combustion engine generally indicated as 10. Further with reference to FIGS. 1 and 2, the system comprises a liquid delivery means including a gasoline or liquid fuel delivery system generally indicated as 12 and a water delivery system generally indicated a 14. The water delivery system comprises a water reservoir or supply 16 which may be in the form of a water storage tank similar to a gasoline or fuel tank in an automobile. The water supply 16 includes a water pump 18 which, when activated, directs water flow along conventional conduit means 20 to a water lock 22 (see FIG. 4). The water lock 22 serves as a regulating element to control or regulate water flow throughout conduit 22 as it travels from the water supply 16 to the intake portion 30 of the vaporization means to be described in greater detail hereinafter. Activating contacts 24 are electrically interconnected to a control means serving to regulate fluid flow and operation of the various components throughout the entire system. The control means will be described in greater detail hereinafter with specific reference to FIG. 5. The water delivery system further comprises a water filter means 26 which is structured to remove impurities and the like before entering the vaporization means generally indicated as 32 (see FIGS. 6 and 7).

As set forth above, the liquid delivery means further comprises the fuel delivery system generally indicated as 12 wherein a conventional fuel tank 28 serves as the fuel supply in accordance with conventional automobile and internal combustion engine structures. A delivery conduit 29 delivers the gas from the fuel tank 28 both to the carburetor 31 and to the fuel delivery system generally indicated as 12. More specifically, a branch conduit 33 serves to direct fuel first to the carburetor 31 and then to conduit 34 which may be considered part of the fuel delivery system 12. A carburetor shut-off valve 35 is disposed in the path of normal fuel flow from fuel tank 28 to the carburetor 31. Upon activation or operation by the control means generally indicated as 70 (see FIG. 5) and upon operation of the subject fuel vaporization system, fuel flow to the carburetor 31 is stopped. Therefore, the fuel is forced to flow through delivery conduit 34 to a fuel lock means 37.

Figure 4:
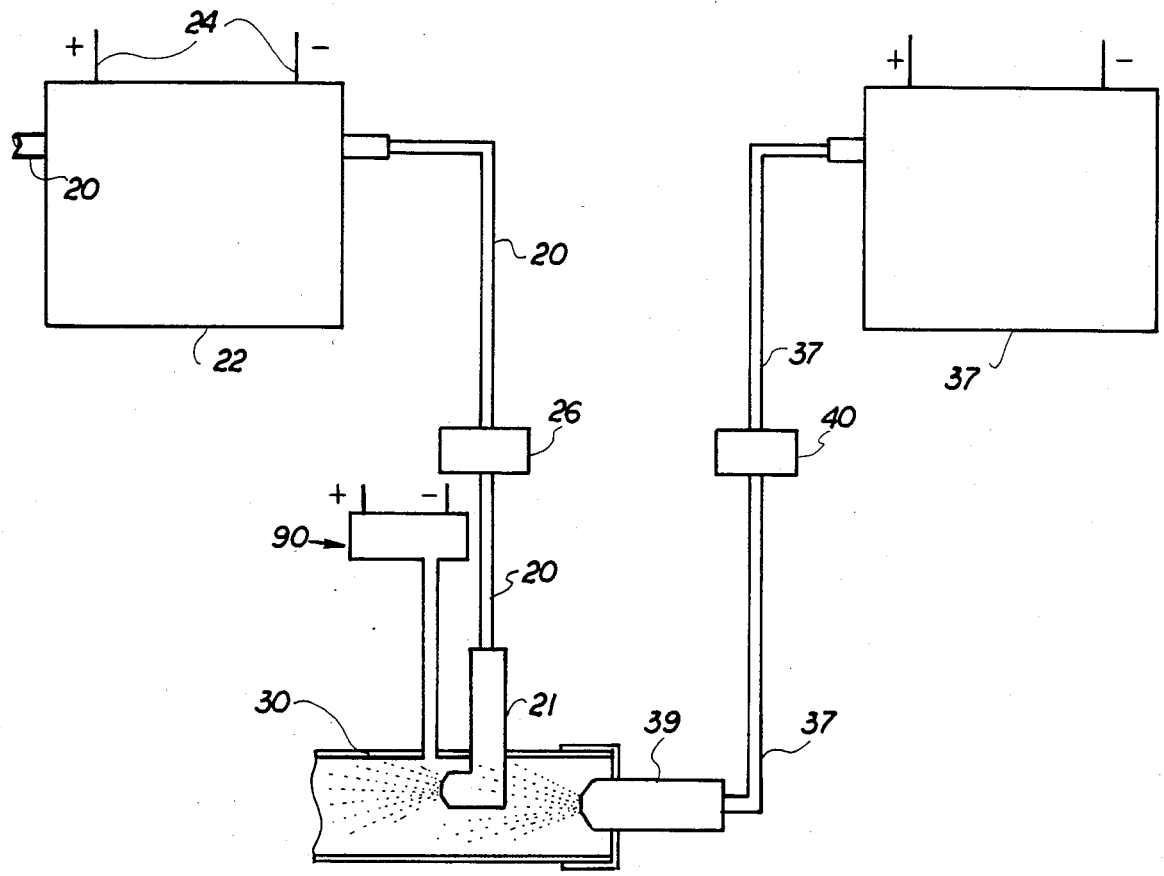
FIG. 4 is a detailed schematic view of the introduction of both water and liquid fuel to the vaporization means of the present invention.
Figure 5:
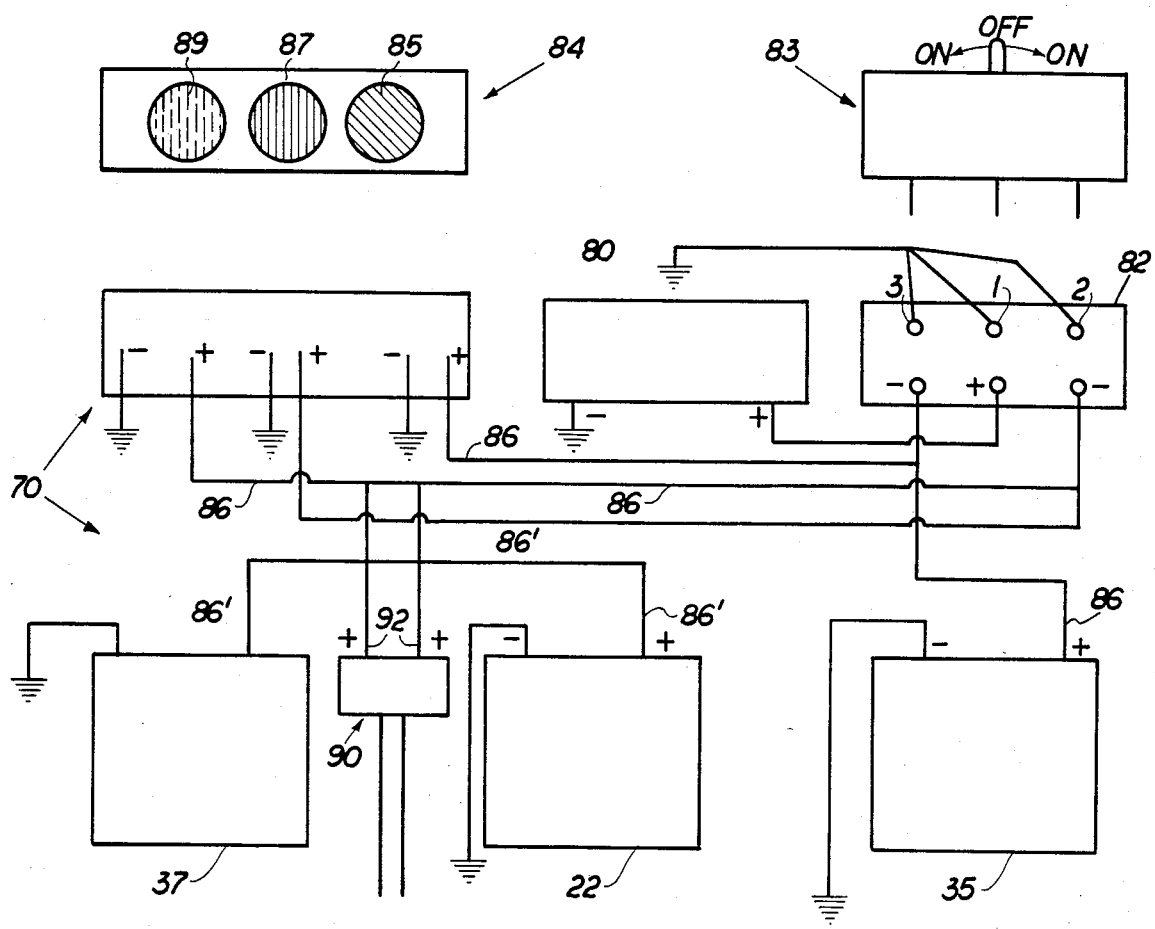
FIG. 5 is a schematic representation of the control means of the present invention.

As best shown in FIG. 4, the fuel lock means 37 also includes electrical contact points 38 which are electrically interconnected to the control means as shown in FIG. 5 and as will be explained in greater detail hereinafter. As with the water lock means 22, the fuel lock means serves to regulate fluid flow from the fuel tank 28 through conduit 37 and beyond to the injection nozzle 39 which is structured to deliver liquid fuel through an orifice of predetermined size preferably 0.30 inches. A filter means 40 is also provided in the path of flow of the liquid fuel, through conduit 37, so as to remove any impurities. It is readily seen therefore that upon controlled activation by the control means 70 (FIG. 5) both the fuel delivery system 12 and the water delivery system 14 are activated to independently but concurrently deliver liquid fuel through conduit 27 and water through conduit 20 to the intake 30 of the vaporization means generally indiated as 32.

Figure 2:
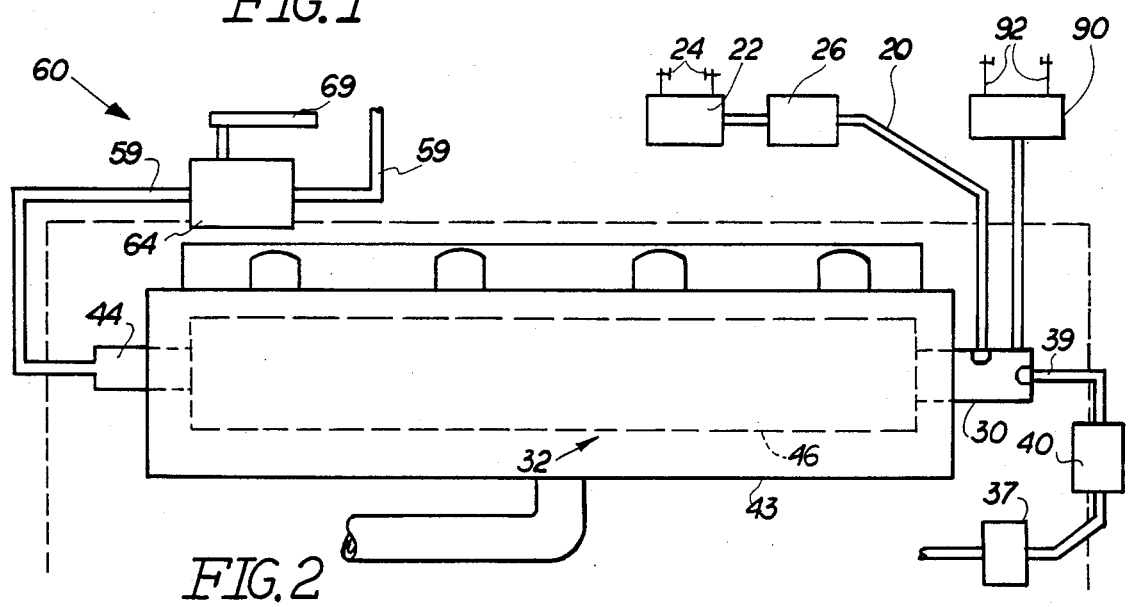
FIG. 2 is a schematic view of the subject system and its relation to the exhaust manifold.
Figure 6:
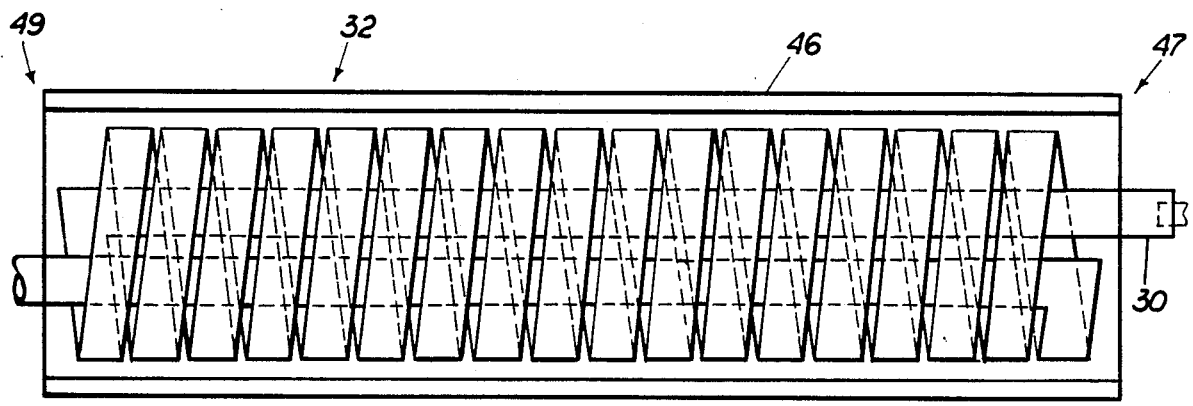
FIG. 6 is a schematic representation of the vaporization means of the present invention in a casing structure.

As best shown in FIG. 2, the vaporization means 32 is represented in broken lines as being mounted on the interior of the exhaust manifold 43 and includes an intake or inlet portion 30 and an outlet 44. It is obvious that the vaporization means 32 is mounted relative to the exhaust manifold 43 so as to be in direct heat transferring relation thereto and so as to receive heat therefrom from the conventional exhaust of the engine. With reference to FIGS. 2, 6 and 7, the vaporization means of the present invention comprise a vaporization tube or chamber 46 including an entrance zone generally indicated as 47 and an exit zone generally indicated as 49. Accordingly, the liquid mixture of fuel and water enters through intake portion 30 at the beginning of the entrance zone 47. Conduit means 50 is mounted on the interior of the vaporization tube 46 and includes a receiving portion 51 which in the preferred embodiment comprises an elongated conduit of substantially straight line configuration extending from the entrance zone 47 to the exit zone 49 and being of sufficient dimension to extend along at least one length of the overall vaporization tube 46 or length of the conduit means generally indicated as 50. The liquid mixture traveling along the length of the delivery portion 51 next passes into a return portion 53 comprising a plurality of coils arranged collectively in a spiral configuration. The return portion 53 extends from its point of engagement as at 54 located generally at the exit zone 49, along the entire length of the conduit means 50 to a point or area generally adjacent the entrance zone 47. The return portion of the conduit means 50 is connected as at 55 in the area of the entrance zone 48 to the delivery portion 56 and includes a straight line configuration extending at least the length of the conduit means 50 and vaporization tube 46 wherein it is connected to outlet 44 (see FIGS. 2, 6 and 7). An important feature of the present invention comprises the overall structure of the conduit means 50 being of sufficient length so as to maintain the liquid fuel-water mixture in heat receiving relation relative to the heat generated by the exhaust manifold 43, a requisite amount of time sufficient to accomplish complete vaporization of the liquid mixture. Therefore, the mixture exiting outlet 44 is in a vapor state and is maintained in this state as it passes through conduit 59.

Figure 3:
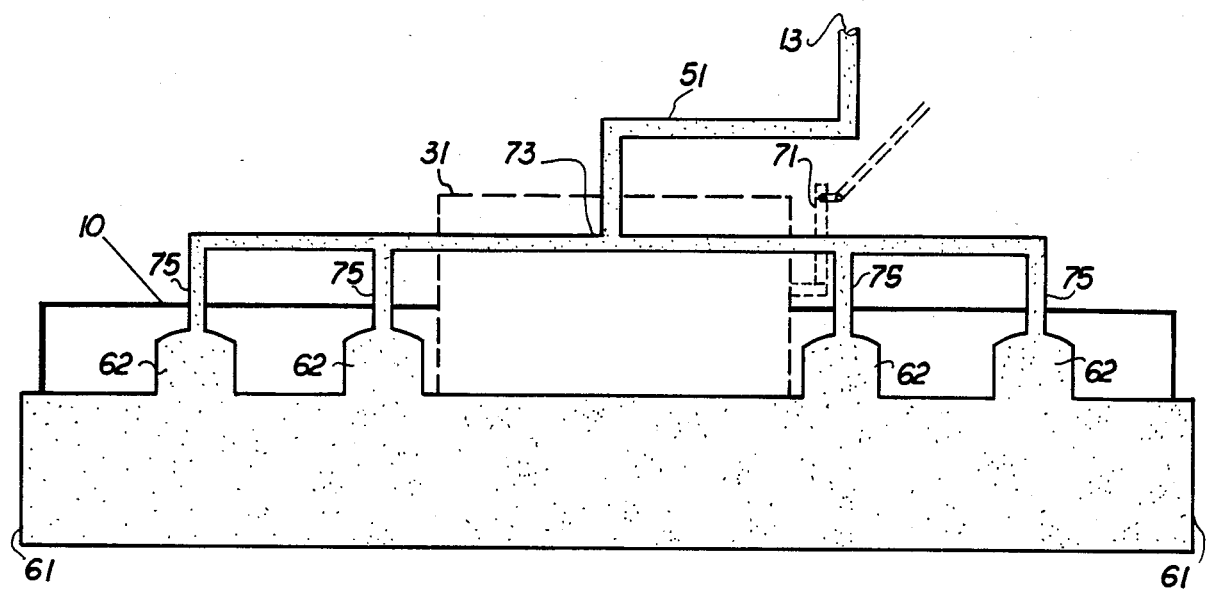
FIG. 3 is the system and its relation to the intake manifold of the subject engine.

With reference to FIGS. 1, 2 and 3, the present invention further comprises a vapor delivery system generally indicated as 60. The vapor delivery system includes a conduit 59 defining the path of vapor flow from the outlet 44 of the exhaust manifold 43 to the intake manifold 61 and the individual entrances to the individual combustion cylinders as at 62. The vapor delivery system 60 includes a vapor control valve 64 (FIG. 2) disposed and structured to regulate vapor flow through conduit 59 from the outlet 44 to the intake manifold 61. Again with reference to FIGS. 1, 2 and 3, linkage means serves to mechanically, or otherwise, interconnect the vapor control valve 64 with the carburetor 31. This linkage means is generally indicated as 66 and includes a linkage coupler 67 which may in the conventional automobile design be represented as an accelerator coupler structure serving to physically operate the carburetor 31. However, in the present invention, the activation of the vapor control valve 64 is synchronized with and directly coupled to the operation of the carburetor 31. Therefore, the linkage means 66 includes a first linkage structure 69 interconnected to the linkage coupler 67 and to the vapor control valve 64. A second linkage structure 71 (FIG. 3) serves to interconnect the linkage coupler 67 directly to the carburetor 31. Accordingly, depression of the accelerator pedal or conventional accelerator structure in the automobile serves to synchronize and mechanically activate both the vapor control valve 64 and the carburetor 31 in synchronized relation to one another. This synchronized relation is necessary due to the fact that the carburetor no longer has a supply of fuel directed thereto and therefore its operation is merely to control the flow of air to the entrances 62 of the individual combustion cylinder communicating with the intake manifold 61 (see FIG.

3). Accordingly, upon simultaneous activation of the vapor control valve 64 and the carburetor 31, vapor fuel passes through the conduit 51 into a divided conduit junction 73. At this point the vapor mixture is forced into each of the individual intakes 75 associated with each of the individual entrances 62 to the various combustion chambers (not shown).

An important feature of the present invention is the provision of the control means 70 best shown in FIGS. 2, 4 and 5. More specifically, the control means 70 includes a conventional source of electrical power such as a battery 80. The battery is interconnected to and serves to power a switching assembly 82 directly interconnected to a manual switch element generally indicated as 83. The control means further includes a bank of indicator lights 84 which visually communicates to the occupant or operator of an automobile the condition of the subject fuel vaporization system. In operation, the operator first switches the switching assembly 83 to the first on position thereby interconnecting poles 1 and 3 as shown in structure 82. This serves to activate the green light 85 and further serves to open the carburetor control valve 35 through proper electrical connections as at 86. By virtue of the opening of carburetor control valve 35, fuel is allowed to flow directly to the carburetor in the conventional fashion for the starting of the engine and for a predetermined warming up period of approximately 2 minutes. Once the engine is sufficiently warm, the switch element 83 is switched to the second on position thereby activating the red light 87 and further serving to close the carburetor control valve which in turn eliminates fuel flow from the fuel tank 28 to the carburetor 31. Instead, fuel is directed through the divided conduit 33 through conduit 34 to the fuel delivery system and the fuel lock means 37. Accordingly, by virtue of this interconnection, both the fuel lock means 37 and the water lock means 22 are both powered and ready for activation upon predetermined conditions. Such interconnections are made through electrical conductors 86 in the conventional fashion. Yellow light 89 serves as a monitoring indicator informing the occupant of the operation of the system.

An important part of the present invention also includes the provision of a pressure sensor means which is disposed and structured to determine the internal pressure of the vaporization means within the interior of the vaporization intake 30 (see FIGS. 1, 2 and 4). The presure sensor means 90, while structured to sense the internal pressure of the vaporization means 32, is further electrically interconnected through contacts 92 to the battery 80 and switching assembly 82 and 83. Further, the pressure sensor means 90 may include proper switching structure which is interconnected in controlling relation to both the water lock means 22 and the fuel lock means 37.

It is readily seen therefore that when the pressure in the vaporization tube or more specifically, the conduit means 50, drops below a predetermined pressure, preferably 4.5 p.s.i., the pressure sensor means 90 detects such an undesirable low pressure and serves to activate the fuel lock means 37 and the water lock means 22 of the respective fuel delivery system and water delivery system. This serves to independently but concurrently deliver fuel and water flow to the intake 30 of the vaporization means for the purpose of increasing the rate of vaporization. The increased vaporization rate in turn increases the pressure to at least a predetermined given level (4.5 p.s.i.) sufficient to keep the subject fuel vaporization system operating on a continuous basis. The result is the continuous production of a fuel vapor exiting from outlet 44 of the vaporization means 32. The fuel vapor then passes through the vapor delivery system generally indicated as 60. The exhaust generating from the exhaust manifold 61 exits through conventional exhaust structure 11 in the normal fashion.

It will thus be seen that the objects of the present invention as set forth above and those objects made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which is a matter of language, might be said to fall therebetween.

Now that the invention has been described,

What is claimed is:

1. A fuel vaporization system of the type primarily designed for an internal combustion engine in an automobile or like vehicle, said system comprising:
   (a) vaporization means mounted in heat receiving relation to an exhaust manifold of an internal combustion engine and structured to vaporize fluid flow therein,
   (b) liquid delivery means including a fuel delivery system and a water delivery system each structured to provide independent and concurrent delivery of liquid fuel and water respectively to said vaporization means,
   (c) control means including a switching assémbly interconnected between a source of elecrtrical power and said liquid delivery means and structured to regulate liquid flow of said fuel delivery system and said water deliver system to said vaporization means,
   (d) vapor delivery means disposed downstream of said vaporization means and comprising vapor conduit means at least partially defining said path of vapor flow and further including a vapor control means disposed in communicating relation to said conduit means and structured to regulate vapor flow therein to the intake manifold,
   (e) said vapor control means further compising a carburetor linkage means interconnected thereto and structured and disposed to activate a carburetor of the internal combustion engine and regulate air flow through the carburetor to the plurality of cylinders of the engine, said carburetor linkage means being further interconnected to an accelerator structure of the automobile such that manipulation of the carburetor causes concurrent activation of said vapor control means and delivery of said fuel-water vapor to the plurality of cylinders of the engine,
   (f) said vaporization means comprising a vaporization chamber disposed in heat-receiving relation to the exhaust manifold and including an entrance zone and an exit zone; said vaporization chamber further comprising conduit means mounted on the interior of said vapor chamber and structured to define a path of travel of fluid flow therein from said entrance zone to said exit zone, (g) said conduit means being pressurized and including a pressure sensor means disposed in communication therewith and structured for determining the pressure within said conduit means, (h) said control means further including a pressure control means interconnected to said pressure sensor means for regulating pressure within said conduit means, said pressure control means interconnected in flow regulating relation to each of said fuel and said water delivery systems, said pressure control means being calibrated to maintain at least a predetermined minimum pressure within said conduit means, said pressure control means being structured to cease flow from said liquid delivery means to said conduit means upon pressure therein being substantially equal to and greater than said predetermined minimum pressure, (i) said vapor control means being cooperatively structured with said vapor delivery means to cause delivery of fuel-water mixture to said intake manifold independent of the carburetor of the engine, the latter interconnected to said vapor control means through said carburetor linkage means to regulate air flow in preset proportion to said vapor mixture and concurrently therewith.

2. A system as in claim 1 wherein said conduit means comprises a receiving portion extending substantially at least one length of said vaporization chamber and a delivery portion substantially extending at least one length of said vaporization chamber and a return portion interconnecting said receiving portion and said delivery portion and extending at least one length of said vaporization chamber.

3. A system as in claim 2 wherein said receiving portion comprises a substantially straight line configuration and is disposed in fluid communicating relation between said entrance zone and said return portion, the latter comprising a continuous coil construction connected in fluid communication from said receiving portion to said delivery portion, said delivery portion extending in fluid communication from said return portion in a substantially straight line configuration to said exit zone.

4. A system as in claim 3 wherein said receiving and delivery portions are configured and disposed to define fluid flow therein in substantially parallel relation and in a common direction, said return portion configured and disposed to direct fluid flow along a substantially spiral path of travel and in a direction opposite to that of said delivery and said receiving portions.

5. A system as in claim 1 wherein said control means includes a carburetor control valve disposed in fluid regulating relation between a source of fuel and a carburetor of the internal combustion engine, said control means structured to eliminate fuel flow through said carburetor valve and to the carburetor during fuel flow between said source of fuel and said fuel delivery system.

6. A system as in claim 5 wherein said switching assembly is powered and interconnected to selectively eliminate normal fuel flow to the carburetor and said linkage means is structured to cause regulation of air flow and vapor flow to the intake manifold upon actuation of the carburetor and said vapor control means respectively through manipulation of said accelerator structure.

7. A system as in claim 1 wherein said fuel delivery system comprises a fuel lock means disposed in and at least partially defining a path of fuel flow from a fuel source to said vaporization means, said fuel lock means structured to control fuel flow to said vaporization means and interconnected in regulated relation to said control means.

8. A system as in claim 7 wherein said water delivery system comprises a fuel lock means disposed in and at least partially defining a path of water flow from a water source to said vaporization means, said water lock means structured to regulate water flow to said vaporization means and being interconnected in regulated relation to said control means.

* * * * *